Oct. 11, 1955    B. K. TICE ET AL    2,720,160
ADJUSTABLE GUIDE MEANS FOR BALER PLUNGER
Filed April 16, 1952    3 Sheets-Sheet 2
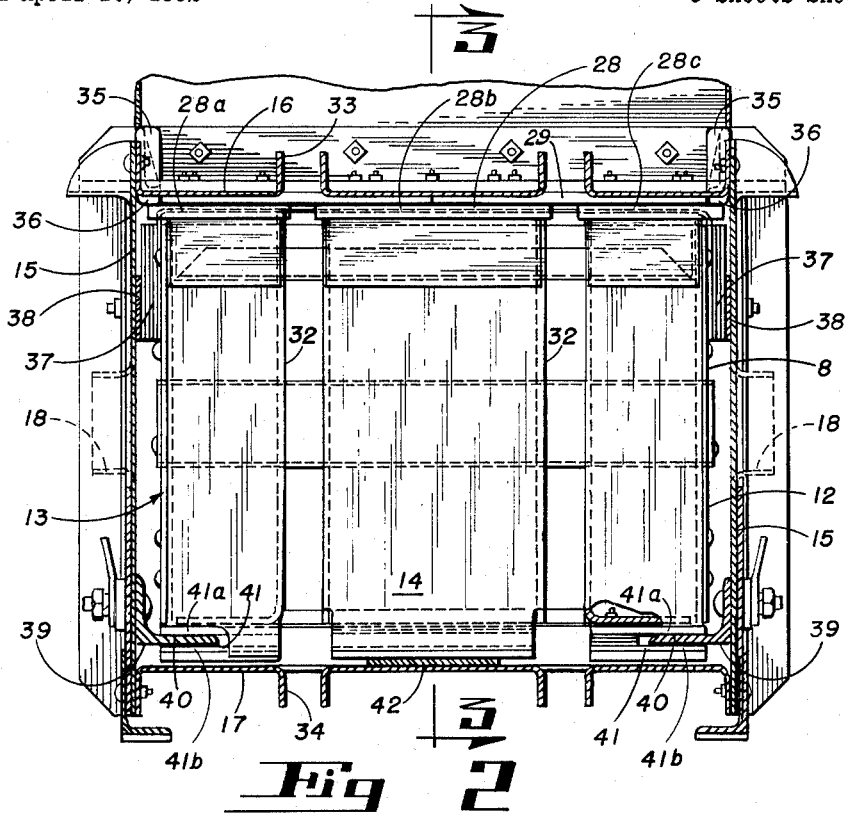
Fig 2
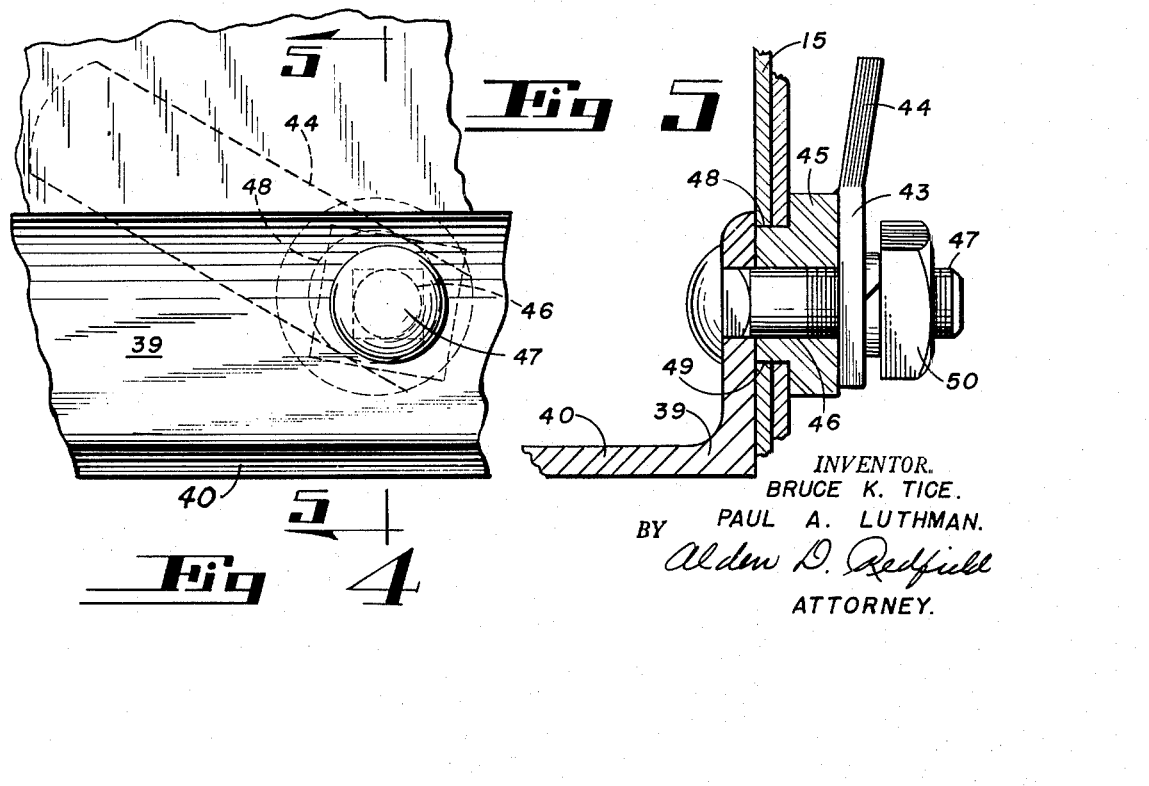
Fig 3
Fig 4
Fig 5
INVENTOR.
BRUCE K. TICE.
PAUL A. LUTHMAN.
BY
Alden D. Redfield
ATTORNEY.

Oct. 11, 1955   B. K. TICE ET AL   2,720,160
ADJUSTABLE GUIDE MEANS FOR BALER PLUNGER
Filed April 16, 1952   3 Sheets-Sheet 3

INVENTOR.
BRUCE K. TICE.
PAUL A. LUTHMAN.
BY
Alden D. Redfield
ATTORNEY.

United States Patent Office 2,720,160
Patented Oct. 11, 1955

2,720,160

ADJUSTABLE GUIDE MEANS FOR BALER PLUNGER

Bruce K. Tice, Celina, and Paul A. Luthman, Maria Stein, Ohio, assignors to Avco Manufacturing Corporation, Cincinnati, Ohio, a corporation of Delaware Application April 16, 1952, Serial No. 282,532

7 Claims. (Cl. 100—98)

The present invention relates to a baler and, more specifically, to an improved adjustable mounting means for supporting a reciprocating plunger within the baler.

The present invention constitutes an improvement in that type of baler which is commonly used for baling hay and similar materials. In balers of this type, it is conventional to provide a reciprocating plunger which compresses the hay, fed to the baler, into compact bales which are bound by wire or twine and then ejected from the baler. The plunger in such a modern baler may operate at a relatively high rate of speed, such as sixty reciprocations per minute. In addition to this high rate of operation, the baler plunger is subjected to sizable loads imposed during that part of the plunger reciprocation during which each charge of hay fed to the baler is compressed and compacted into the bale being formed.

The plunger usually reciprocates inside of a rectangular casing in which the bale is formed. A feed opening is provided in one wall of the casing through which each charge of hay is introduced, the plunger moving past the opening periodically, thereby preventing, momentarily, the feeding of additional material to the casing while the plunger advances to compress the previous charge into the bale. It has been found desirable to provide a knife on the plunger cooperating with a stationary knife attached to the casing adjacent the feed opening. The moving plunger knife cooperates with the stationary casing knife to sever strands of hay which are not forced completely into the casing. Thus, as the plunger advances to cover the feed opening the knives sever these strands of hay and prevent jamming of the hay between the plunger and casing.

It is necessary to provide supporting means for the plunger which is not only strong, but which also serves to centralize the plunger within the casing. Another requirement of this type installation is that the plunger be movable within the casing with a minimum of friction. Another important requirement is installations incorporating knives is that some means be provided for adjusting the plunger within the casing so that the clearance between the edges of the knives can be set and maintained at the proper value.

In accordance with the teaching of the present invention, the plunger is centralized within the casing by means of a plurality of bearing blocks attached to the plunger and cooperating with longitudinal wear strips secured to the interior surfaces of the casing. The weight of the plunger is carried by a pair of angle iron supports adjustably secured by eccentrics to the side walls of the casing, one leg of each angle iron projecting into the casing to engage the plunger. Bearing surfaces are provided on the plunger for engagement with the outstanding legs of the angle irons and, in this way, the plunger is constrained to move along a predetermined path. The eccentrics make possible vertical adjustment of the plunger within the casing so that the clearance between the movable and stationary knives can be set properly.

Another advantage inherent in this adjustable mounting is that compensation can be made for wear of the bearing blocks. In this way, uninterrupted operation of the baler can be maintained for an unusually long time without need for dismantling the baler for replacement of bearing surfaces.

In view of the foregoing, it is an object of the present invention to provide an adjustable mounting means for a bale plunger, particularly means permitting adjustment of the clearance between knives attached to the plunger and the casing which houses the plunger.

Another advantage of the present invention is the provision of an improved bearing installation for centralizing a movable plunger within a bale casing.

A further object of the present invention is the provision of supporting means for a plunger which is adjustable to compensate for wear of the plunger bearing surfaces.

A still further object of the present invention is the provision of stationary guide means for guiding a movable plunger knife past a stationary knife on a bale casing.

A particular advantage of the present invention is that it greatly facilitates the adjustment of the knife clearance and makes it possible to maintain the clearance at an optimum value throughout the life of the baler. Another advantage is that adjustment of the knife clearance, and the position of the plunger within the casing, can be easily effected by adjustments readily accessible from the exterior of the baler.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 2 is a cross-sectional view taken on plane 2—2 of Figure 3 showing the forward end of the plunger and certain details of the adjustable mounting means for positioning the plunger within the bale casing;

Figure 3 is a longitudinal, vertical sectional view taken on plane 3—3 of Figure 2 showing the plunger in side view and showing additional details of the adjustable mounting means;

Figure 4 is a fragmentary view showing one of the eccentric adjustments for the mounting means, the view being drawn to an enlarged scale and showing the eccentric adjustment as viewed from the interior of the bale casing; and Figure 5 is a cross-sectional view of the eccentric adjustment taken on plane 5—5 of Figure 4.

Figure 1:
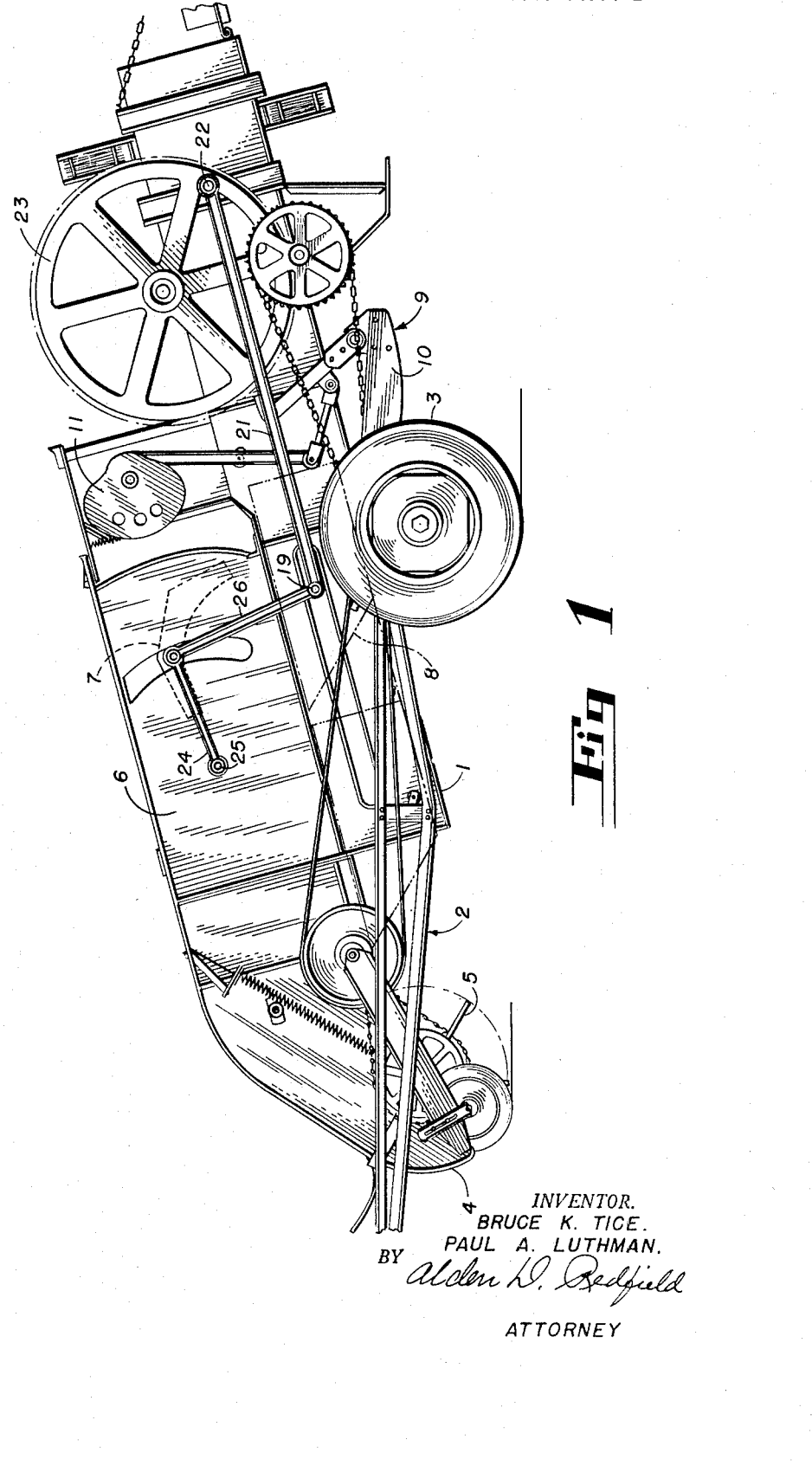
Figure 1 is a side elevational view of a complete baler of the type with which the present invention has particular utility.
Figure 7:
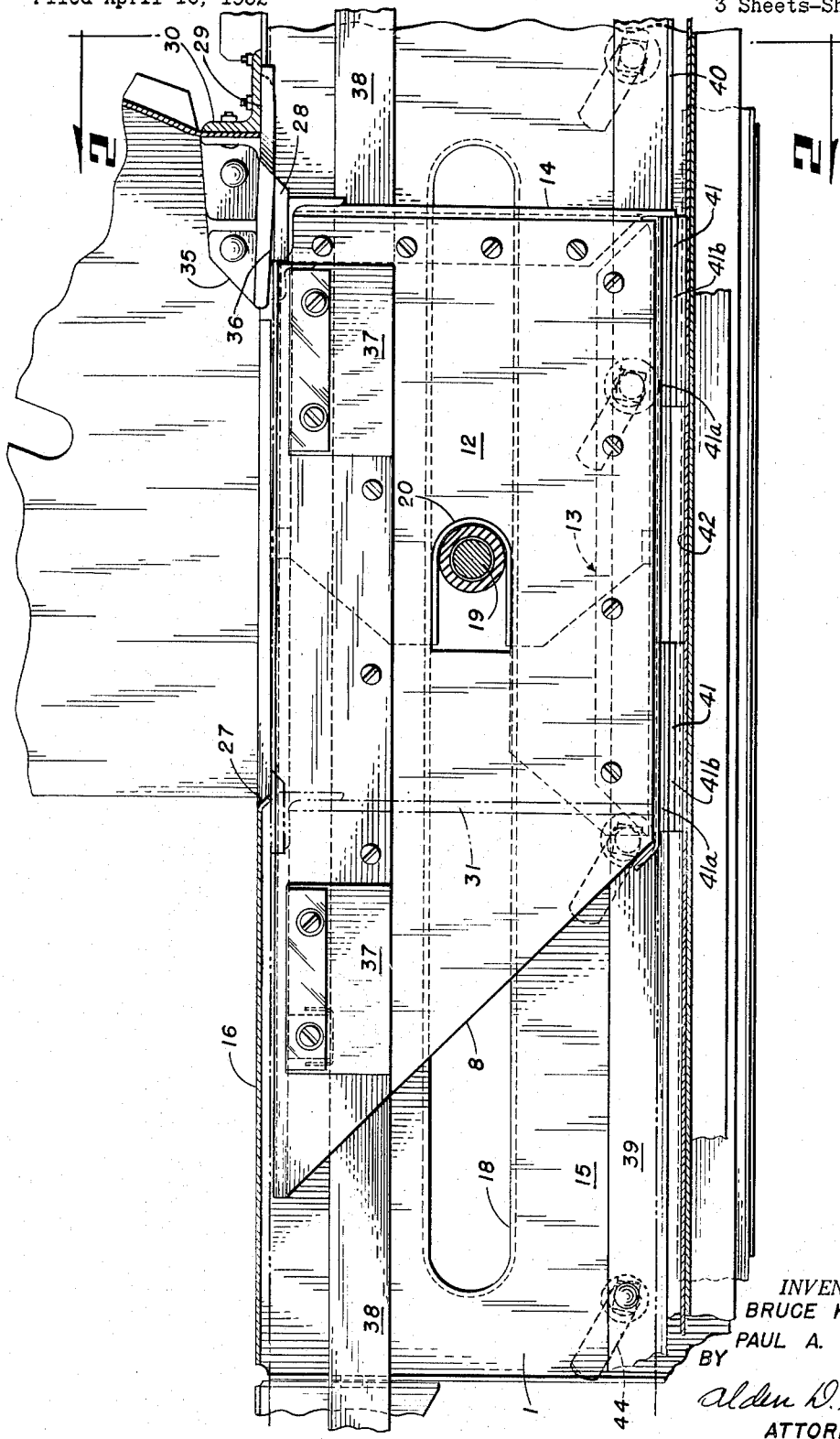

Although the present invention is not restricted to use in a portable agricultural baler, it is illustrated with reference to this type of implement, shown in Figure 1. As indicated in this figure, the baler comprises a bale casing 1 secured to a framework, generally designated 2, the framework being supported by ground wheels 3. The baler includes a crop pickup 4 including a rotary pickup cylinder 5 by means of which previously severed crops can be picked up from a field and fed into a feed chamber 6. From the feed chamber the crop, such as hay, is forced into the bale casing by means of a ram 7 which is reciprocated in the feed chamber above the bale casing.

After the hay is forced into the bale casing by ram 7, it is compacted and forced to the right along the casing by means of a reciprocating plunger 8, indicated in phantom lines in Figure 1 in its extreme positions of reciprocation. After sufficient hay has been compacted to form a bale, a binding and tying mechanism operates to bind the bale after which it is ejected from the baler.

The binding and tying mechanism constitutes no part of this invention and is indicated generally at 9. For the purposes of the present invention, it is sufficient to understand that this mechanism incorporates a pair of needles, indicated at 10, in Figure 1; by means of cam 11, these needles are periodically swung upwardly through the bale casing to carry binding wires around the bale being formed.

The plunger and portions of the surrounding bale casing are shown more fully in Figure 3. Plunger 8 includes a pair of side walls 12 and a structural framework, generally designated 13, which rigidly support forward end 14. End 14 engages the hay while the plunger compresses it into bales within the casing.

Bale casing 1 incorporates side walls 15, top wall 16, and a bottom wall 17, forming, in effect, an elongated rectangular chamber in which the hay is compacted. The side walls 15 of the casing are slotted, as at 18, to permit passage of a transverse pin 19 which is engaged with a semi-cylindrical saddle 20 which forms a part of the plunger and transfers the driving loads from pin 19 to the plunger.

As illustrated in Figure 1, pin 19 is engaged at each side of the baler by a pitman 21 which is also attached by pin 22 to a bull gear 23. This gear is continuously rotated during operation of the baler by a driving mechanism (not shown). As will be apparent to those skilled in the art, the rotation of gear 23 imparts reciprocation to plunger 8, the plunger making approximately sixty (60) complete cycles of movement each minute.

With further reference to Figure 1, it will be noted that ram 7 is pivotally attached to arms 24 for swinging movements about axis 25, the swinging movement of the ram being coordinated with the reciprocation of the plunger through interconnecting links 26.

As illustrated in Figure 3, top wall 16 of the bale casing defines a feed opening 27 through which the material to be baled is forced into the casing by ram 7. The ram retreats from opening 27 as plunger 8 advances towards the right. Near the extreme compression position of the plunger, the direction of movement of the ram reverses; and the ram forces hay through the feed opening as the plunger moves to the left and uncovers the feed opening. Most of the material is forced completely into the casing but occasionally a few strands remain half in the casing and half in the feed chamber. To prevent these strands from jamming between the plunger and the casing, a knife 28, made in three sections as will be explained hereinafter, is attached to and carried by the plunger. This knife 28 cooperates with a stationary knife 29 secured to a transverse angle iron 30 which also acts as a cross brace for the top wall of the bale casing.

As the plunger moves to the right to close the feed opening 27 and to compress the hay inside the bale casing, knife 28 passes beneath knife 29 and severs any strands of material which are partially within the casing. When the plunger is moved to the left, ram 7 is lowered as has been explained, the plunger 8 eventually attaining the extreme position indicated by phantom lines at 31 in Figure 3. After reaching this position, the direction of movement of the plunger is reversed; the cycle of operation of the plunger and ram is thereafter repeated.

It is desirable to have the bale, being formed within the casing, bound by wire or twine while it is held in a condition of maximum compression by the plunger. Thus the tying operation is performed while the plunger is approximately at its extreme position of movement towards the right. Since the needles 10 must pass up through the bale casing at this time to aid in performing the tying operation, it is necessary to provide clearance slots 32 in the plunger through which the needles may pass in moving through the casing. The top and bottom walls 16 and 17 of the casing are also slotted at 33 and 34, respectively, to permit passage of the needles. It is because of the slots 32 in the forward end of the plunger that the knife 28 must be made in three sections 28a, 28b, and 28c. In this way, mechanical interference of parts is avoided.

In order to get satisfactory cooperation between knives 28 and 29, it is desirable that they pass each other with very close clearance, in the order of .040 to .060 of an inch. With such close clearances, however, there is some danger that the knives may physically interfere, as when the material being baled gets jammed momentarily beneath the plunger during its movement. To prevent such interference, castings 35 are provided at each side of the bale casing extending to the left of the stationary knife 29, as illustrated in Figure 3. These castings have lower guide surfaces 36 which lie in substantially the same plane as the cutting edge of the stationary knife and are adapted to guide the moving knife 28 beneath the stationary knife thereby preventing any physical interference of parts.

The plunger must be centralized sideways within the casing and, for this purpose, bearing blocks 37 are secured to the sides 12 of the plunger. These bearing blocks cooperate with wear strips 38 which are secured to the interior side walls of the casing. The bearing blocks are faced with some wear-resistant frictionless bearing material, such as phenolic plastic which creates a minimum of frictional resistance while holding the plunger centrally between the wear strips.

The weight of the plunger is carried by a pair of longitudinally extending support members 39 which are adjustably attached, as will be explained, to the interior surfaces of the bale casing. These members may take the form of angle irons, each angle iron having one outstanding leg 40 projecting into the casing. Legs 40 are engaged with lower bearing blocks 41 secured to the lower part of the plunger. As indicated in Figure 2, these bearing blocks 41 have upper and lower bearing surfaces 41a and 41b, respectively, which engage the top and bottom surfaces of legs 40. By virtue of these bearing surfaces, movement of the plunger vertically within the casing is prevented, and, in cooperation with bearing blocks 37, the plunger is fully guided in its reciprocating movements within the casing.

As a precautionary measure, a wear strip 42 may be attached to the interior face of bottom wall 17 of the casing so that at no time can the plunger actually come into bearing engagement against the bottom of the casing.

With particular reference to Figures 4 and 5, it will be noted that support angle irons 39 are adjustably secured to the side walls 15 of the casing by a plurality of eccentric adjusting means 43. Each adjusting means comprises a handle 44 which is welded to an eccentric 45, the eccentric having a central hole 46 through which is passed a bolt 47. A cylindrical shoulder 48 is defined by member 45 eccentrically with hole 46. This shoulder is passed through a complementary opening 49 formed in side wall 15 of the casing. A nut 50 on bolt 47 may be loosened to permit rotation of handle 44 and conjointly member 45. By virtue of the eccentric relationship of the shoulder 48 and hole 46 (as illustrated in Figure 4) bolt 47 is raised and lowered vertically relative to the casing and carries with it the angle iron support 39 through which the bolt passes. After the adjustment is effected by movement of handle 44, nut 50 can be tightened to maintain the selected position.

As illustrated in Figure 3, a plurality of the eccentric adjusting means is provided at each side of the baler for adjustably supporting each angle iron 39. When it is desirable to adjust the position of the plunger vertically, it is merely necessary to loosen the nuts 50 at each side of the casing and to shift each handle 44 by a comparable amount thereby raising the entire plunger or lowering it, as may be required.

It has been found convenient in practice to set the knife clearance while knife 28 is below knife 29. A piece of feeler stock .040 to .060 of an inch thick may be inserted between the knives and the eccentric adjusting means rotated to bring the plunger knife up against the feeler stock. When this has been done, in a manner well-known to those skilled in the art, the nuts 50 are tightened and the plunger is properly adjusted for movement within the casing. During the setting of the knife clearance, the two eccentric adjusting means at each side of the bale casing nearest the knives are relied upon primarily. The associated angle iron supports 39 have sufficient rigidity to move as a unit under the influence of these eccentric adjusting means, the other adjusting means to the left being of lesser importance and merely being adjusted as required to assure freedom of movement of the plunger during its reciprocating movements.

By virtue of this invention improved means is provided for adjusting the vertical position of a baler plunger within its casing through adjusting means readily accessible from the exterior of the bale casing. This is important since it greatly facilitates adjustment of the plunger in the field without any disassembly of the baler and without the use of special tools.

The adjusting means described herein can also be used to advantage to compensate for wear of the bearing blocks 41. In practice, the bearing surfaces 41a usually experience the most severe wear and the effects of this wear can be easily offset by merely raising the angle iron supports 39 by an amount commensurate with the wear. In this way, prolonged operation of the baler is possible without disassembly for replacement of bearing surfaces. Since the bearing blocks 37 do not carry any sizable loads, it is not necessary to provide means for compensating for their wear.

Having described a preferred embodiment of our invention we claim:

1. In combination in a baler including a bale casing having side, top, and bottom walls and a reciprocating plunger movably disposed within the casing, supporting means for the plunger comprising bearing members secured to the sides of the plunger for centralizing the plunger between the side walls of the casing, longitudinally extending support means secured to the interior side walls of the casing and projecting into the casing, bearing means on the plunger in engagement with the projecting portions of said support means, and adjusting means disposed on the exterior of the casing for raising and lowering said support means whereby said plunger may be raised and lowered within the casing.

2. In combination a bale casing having side, top, and bottom walls, a plunger movably disposed within said casing, means on said plunger for centralizing it between the side walls of said casing, longitudinally extending support means secured to the side walls and extending into said casing, bearing means on said plunger engaging said support means, and eccentric adjusting means engaged with the side walls of said casing and said support means, whereby said support means may be adjusted vertically relative to said casing.

3. In combination an elongated bale casing including side, top, and bottom walls, a plunger movably disposed within said casing, bearing means secured to the side walls of said plunger for bearing engagement with the sides of said casing, support means adjustably secured to the side walls of said casing and having portions projecting laterally into said casing, bearing means on said plunger engaging said projecting portions of said support means, a stationary knife on the top of said casing, a movable knife on said plunger for cooperation with said stationary knife, and eccentric adjusting means engaged with the side walls of said casing and said support means whereby said adjusting means may be adjusted to shift said support means vertically to regulate the clearance between said stationary and movable knives.

4. Apparatus as defined in claim 3 and, in addition, stationary knife guides secured to said casing adjacent said stationary knife, whereby said movable knife on said plunger is guided in close clearance relationship beneath said stationary knife.

5. In combination in a baler including a bale casing having side, top, and bottom walls, and a reciprocating plunger movably disposed within the casing for movement past a feed opening defined by the top wall, a stationary knife attached to the casing adjacent the feed opening, a movable knife attached to said plunger for cooperation with said stationary knife during the reciprocation of the plunger, means for centralizing the plunger between the side walls of the casing, support means adjustably attached to the side walls of the casing and projecting into said casing, bearing means on the plunger in engagement with said support means, and externally accessible adjusting means in engagement with the casing side walls and said support means for raising and lowering said support means whereby said movable plunger knife can be adjusted to pass in close clearance relationship beneath said stationary knife.

6. In combination, an elongated bale casing including side, top, and bottom walls, a plunger movably disposed within said casing, bearing blocks secured to the sides of said plunger, wear strips on the interior side walls of said casing cooperatively disposed for engagement by said bearing blocks, angle iron supports on the interior side walls of said casing with one leg of each angle projecting into said casing, additional bearing blocks on said plunger for engaging the top and bottom surfaces of said projecting legs of said angle iron supports, a stationary knife on said casing, a movable knife on said plunger for cooperation with said stationary knife, eccentric adjusting means rotatably engaged with said side walls and in engagement with said angle iron supports, each eccentric adjusting means having an externally accessible adjusting handle so that said adjusting means may be rotated, and said support means raised and lowered within said casing whereby said movable plunger knife may be adjusted for passage beneath said stationary knife in close clearance relationship, and stationary knife guides on said casing adjacent said stationary knife to guide said movable knife past said stationary knife without physical interference.

7. In combination a bale casing having side, top, and bottom walls, a plunger movably disposed within said casing, means for centralizing said plunger between the side walls of said casing, longitudinally extending support means secured to the side walls of said casing, bearing means on said plunger engaging said support means, and adjusting means engaged with the side walls of said casing and with said support means, whereby said support means may be adjusted vertically relative to said casing.

References Cited in the file of this patent

UNITED STATES PATENTS

| | | |
|---|---|---|
| 454,495 | Peterson | June 23, 1891 |
| 492,037 | Madden | Feb. 21, 1893 |
| 552,310 | Williams | Dec. 31, 1895 |
| 731,663 | Carr et al. | June 23, 1903 |
| 1,096,051 | Nabb | May 12, 1914 |
| 1,226,900 | McLean | May 22, 1917 |
| 1,231,354 | Hilton et al. | June 26, 1917 |
| 2,293,679 | Barker | Aug. 18, 1942 |
| 2,362,861 | Russell | Nov. 14, 1944 |

FOREIGN PATENTS

| | | |
|---|---|---|
| 162,841 | Germany | Oct. 3, 1905 |